Figure 1:
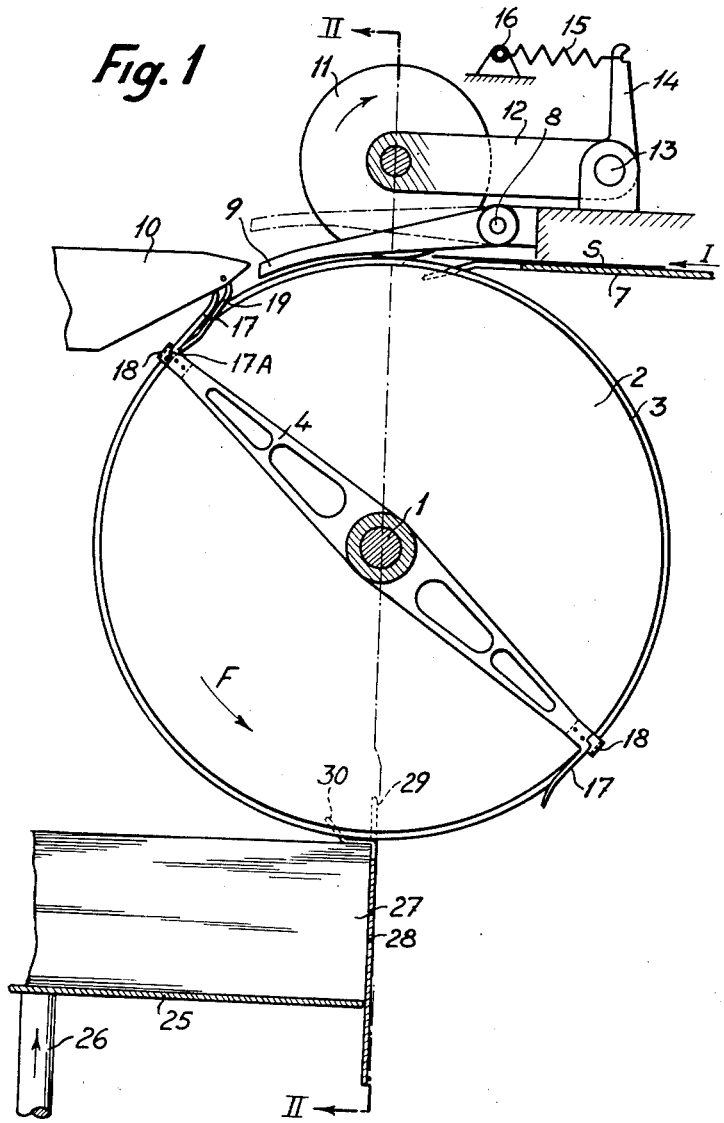

July 24, 1962

P. H. HARTEL 3,046,009

DEVICE FOR CONVEYING AND STACKING DOCUMENTS BEARING REGISTRATIONS

Filed Feb. 1, 1961

6 Sheets-Sheet 3

Inventor:
Pieter Hendrik Hartel
By Baldwin & Wight
Attorneys

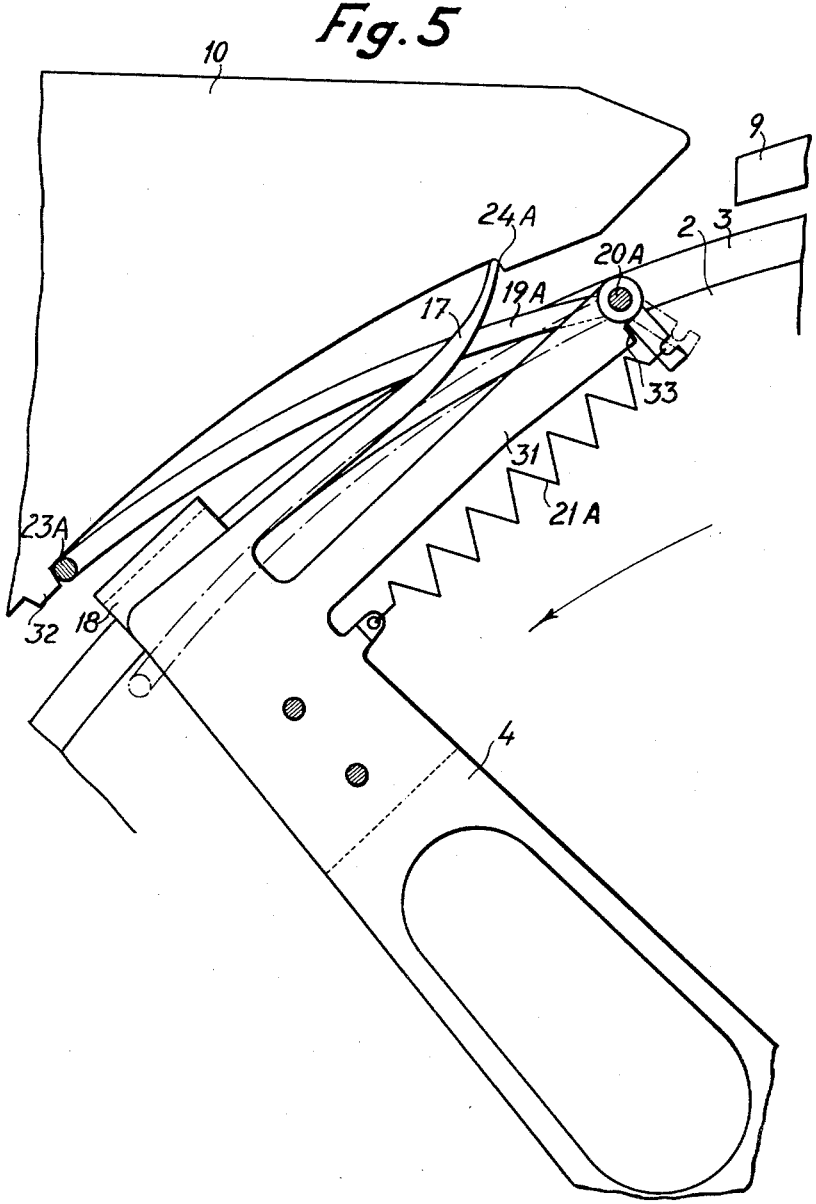

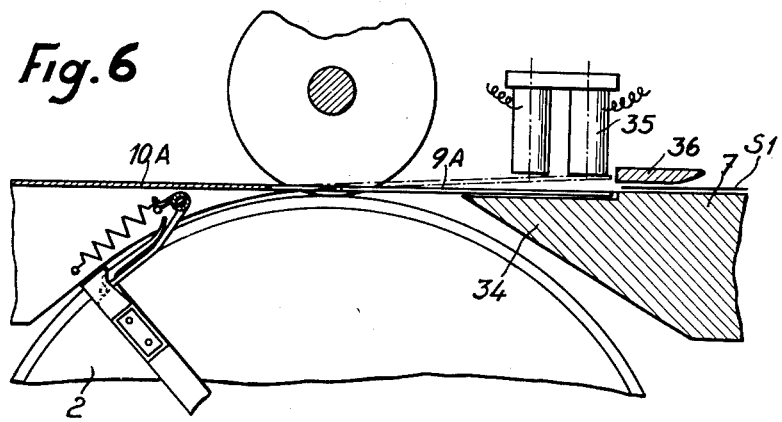
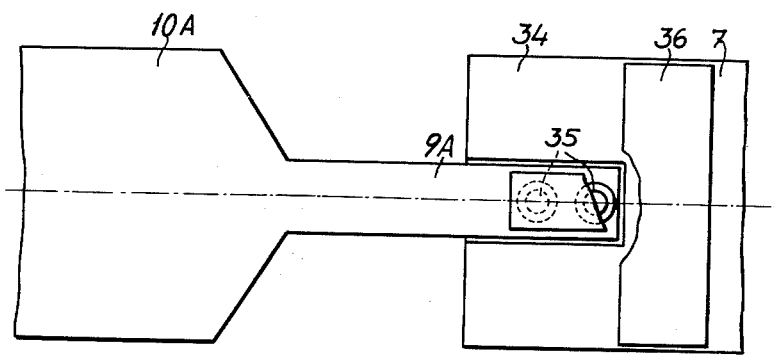

United States Patent Office 3,046,009
Patented July 24, 1962

3,046,009
DEVICE FOR CONVEYING AND STACKING DOCUMENTS BEARING REGISTRATIONS
Pieter H. Hartel, Amsterdam, Netherlands, assignor to Bull Nederland, Administratie- en Statistiekmachine Mij. N.V., Amsterdam, Netherlands
Filed Feb. 1, 1961, Ser. No. 86,418
Claims priority, application Netherlands Feb. 9, 1960
4 Claims. (Cl. 271—71)

This invention relates to apparatus for conveying and stacking sheets, including document, for example, cheques, forms, punched cards, flat articles of correspondence or the like, whether formed of paper or of other material.

One object of the invention is to provide apparatus for a desired stacking of sheets, e.g. documents regardless of their dimensions and of the material of which the documents are formed. Another object of the invention is the provision of high-speed conveying and stacking apparatus, that is to say, apparatus capable of dealing with a large number of sheets per unit time. A further object is to provide apparatus which can operate with absolute reliability for machines in which the interval, constant in principle, between the forward edges of the documents successively introduced, can vary within certain limits.

In accordance with the invention there is provided apparatus for conveying and depositing on a stack, flexible sheets which are successively advanced along a track to a selecting point, said apparatus comprising a continuously rotatable driving device disposed substantially tangentially in relation to the track at said selecting point, selecting means, and conveying and guiding members which are disposed fast one with respect to another and which are adapted to be driven by said driving device in order to guide, convey and deposit selected sheets on a stack, the apparatus further comprising locking means adapted to hold one of the conveying and guiding members stationary in a receiving position in which said one member can receive the forward edge of a selected sheet, the said locking means being so arranged that the introduction of the forward edge of a sheet into said conveying member acts on said locking means, brings about the release of said conveying member and permits it to be displaced by the driving device, in order that the selected sheet may be conveyed and deposited on the stack, and another of said conveying members can be brought simultaneously to the receiving position in which said other member is held fast by the said locking means.

The apparatus may be employed in combination with devices for reading or sorting documents, and a number of analogous apparatus may be so disposed at various positions along a track as to be able to stack documents in a selective manner.

The conveying members may conveniently be driven by friction against a rotating driving device.

In one embodiment of the invention, the driving device comprises two discs provided with circular friction rings, between which there is situated a conveying member provided with a dog or tongue directed towards the point of arrival of the sheets and so arranged that a sheet arriving tangentially in relation to the two rings can be taken up and pressed against the rings by said dog so as to strengthen the frictional contact between the sheet and the rings.

The parts for holding the conveying members stationary may comprise a detent which is so arranged that the advance of a sheet towards a conveying member displaces the said detent, cancels out the locking of the said conveying member by the said detent and permits the drive of the sheet.

Alternatively, the parts serving to hold a conveying member stationary, may comprise a detent supported by said conveying member and projecting radially outwards, the movable end of which detent may take up a position in a recess in a fixed member co-operating with the movable end of said detent for the purpose of holding said conveying member stationary, the detent being so arranged that a sheet advanced towards the conveying member presses said detent out of said recess so as to release the conveying member.

In another embodiment, the dog of the conveying member comprises a lever fast with a rocking member and auxiliary friction members disposed above the rings on the driving device, so that the advance of a sheet in the conveying member causes said lever to rock and brings the auxiliary friction members into contact with the driving rings so as to assist in the driving of the conveying member by friction against the said rings.

When a conveying member is brought by said device into a position for depositing a sheet on a stack, rollers cause the auxiliary friction members to penetrate deeply into the driving rings and move the dog forming a lever away from the rings and the sheet so as to release the latter and to deposit it on the stack.

The apparatus can be arranged for operation even with sheets of substantially differing dimensions.

Figure 2:
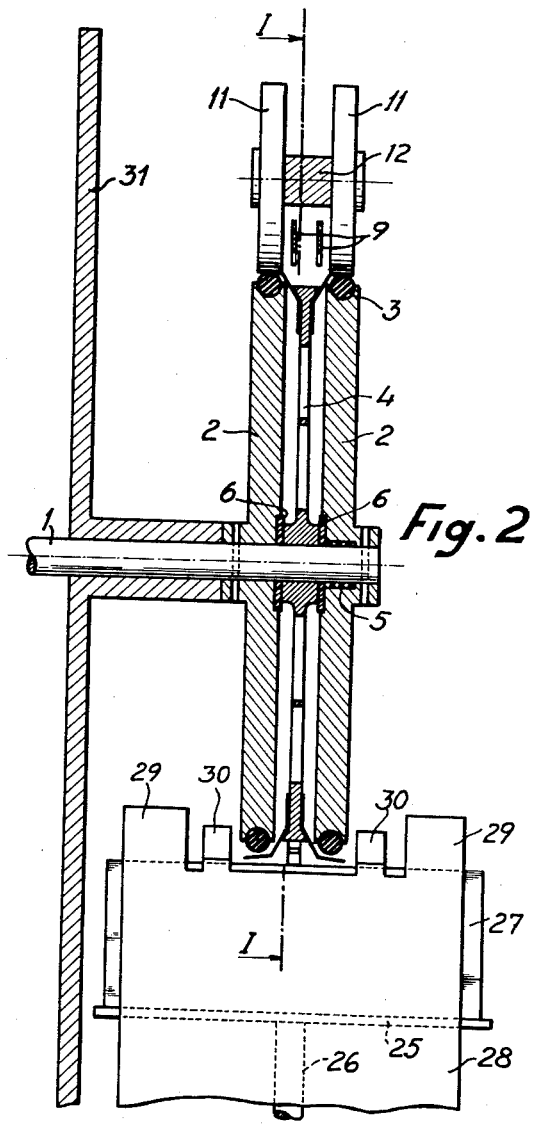
Figure 3:
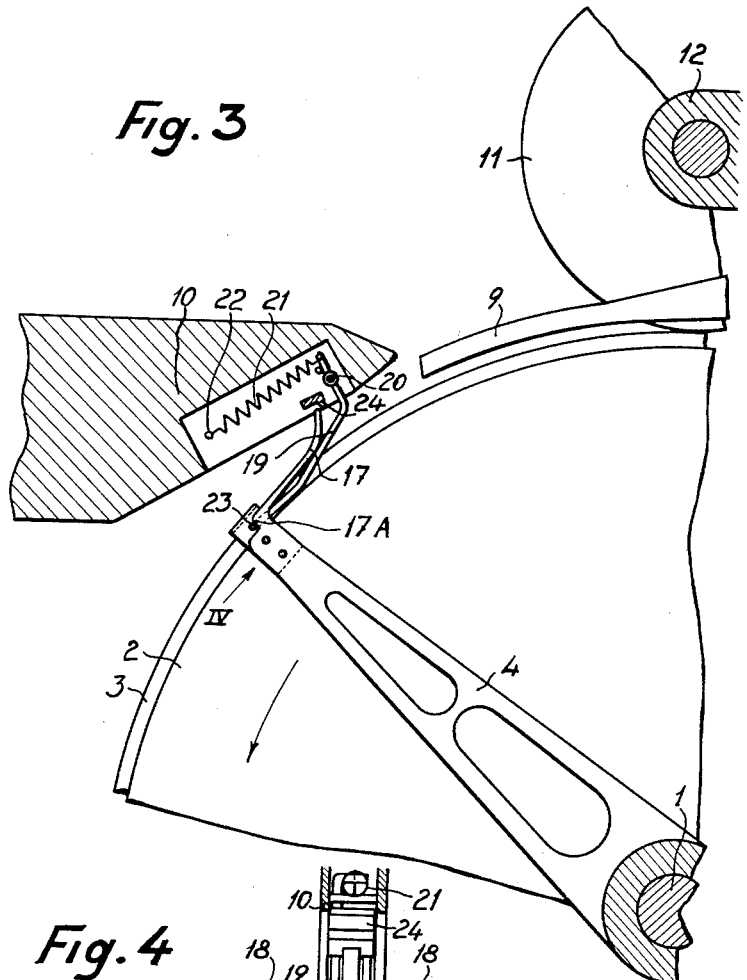
Figure 4:
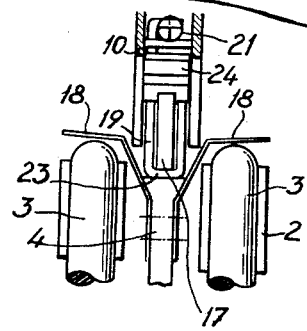

For a better understanding of the invention and the manner in which it may be performed, the same will now be described, by way of example, with reference to the accompanying drawings, in which:

FIGURE 1 is a diagrammatic side view, partly in section along the line I—I of FIGURE 2, of apparatus in accordance with one embodiment of the invention, FIGURE 2 is a fragmentary vertical section through the apparatus of FIGURE 1 along the line II—II, at the instant when the conveying members are moving on to the vertical axis of the apparatus, FIGURE 3 is a sectional view to a larger scale of the parts which, in the apparatus of FIGURE 1, co-operate to hold a conveying member stationary, FIGURE 4 shows a number of details of FIGURE 3 partly in section and as seen in the direction of the arrow IV.

Figure 8:
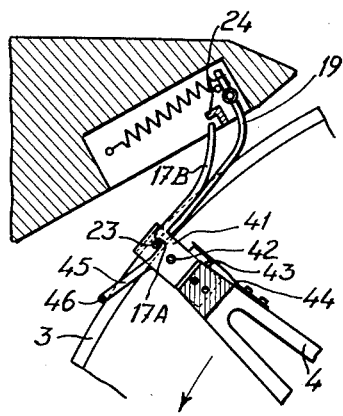
Figure 11:
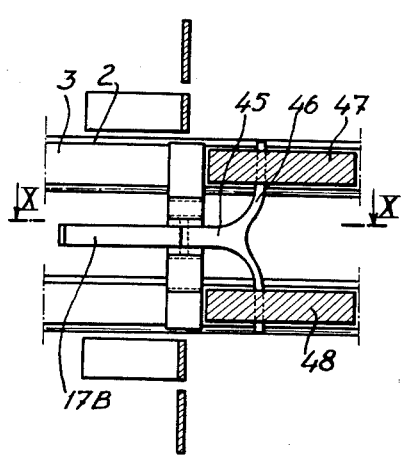
Figure 9:
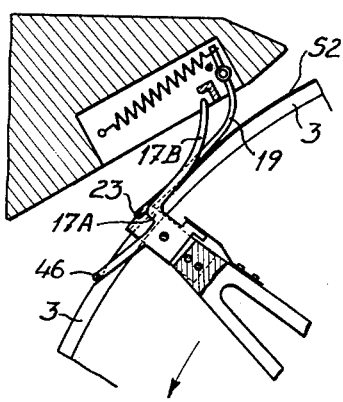
Figure 10:
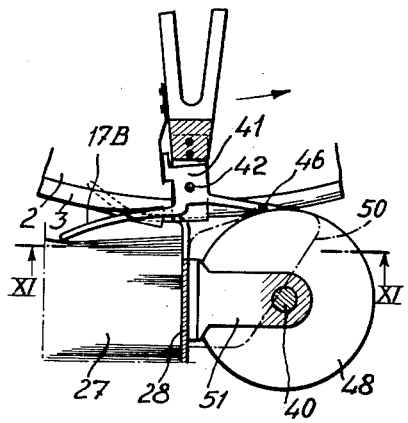

FIGURE 5 is a modified constructional form of a device for holding the conveying members stationary, FIGURE 6 is a diagrammatic view of a modified constructional form of an electromagnetically controlled guiding and selecting lever, FIGURE 7 is a diagrammatic plan view of a part of a conveying track provided with a guide lever of the type illustrated in FIGURE 6, FIGURE 8 illustrates partly in section a modified constructional form of a conveying member provided with auxiliary friction members, in the immobilised position, FIGURE 9 illustrates the introduction of a document into a conveying member in accordance with FIGURE 8, FIGURE 10 illustrates the deposition of a document on a stack by means of a conveying member in accordance with FIGURE 8, and FIGURE 11 is a section taken in the direction of the arrows XI—XI through the apparatus illustrated in FIGURE 10.

Apparatus according to the invention is widely applicable in use for conveying and stacking documents of various sorts; but, more generally considered, the apparatus is useful for conveying and stacking sheets of different materials, whether or not inscribed, printed, punched or otherwise marked with information. The term "document" as used herein encompasses sheets, in general.

The conveying and stacking apparatus illustrated in FIGURES 1 and 2 comprises a driving shaft 1 for continuously rotating in the direction of the arrow F, and two driving discs 2 which are fast with the shaft and constitute the main element of a driving device.

The discs 2 are each provided on their external periphery with a driving ring 3 formed of a material having a high coefficient of friction such as, for example, rubber.

Disposed between the discs (FIGURE 2) is a double arm 4 of which the ends are provided with conveying members for documents to be stacked, which arm can be driven by the friction of certain parts of said arm against the driving shaft 1 and against surfaces driven by said shaft. For this purpose, the arm 4, which is rotatably mounted on the shaft 1, is disposed between friction plates 6 driven by said shaft and pressed by a spring 5 against the central portion of the double arm 4, which may be formed, for example, of nylon, while the plates 6 may be formed of bronze.

In FIGURE 1, documents S are fed one-by-one along a conveying track 7 and move in the direction indicated by the arrow I.

The track extends, or terminates, tangentially to the external circumference of the rings 3 on the discs 2. A little beyond the point of contact of the track 7 with the rings on the discs 2, there is situated the end of a guiding and selecting lever 9 pivotally mounted on a pin 8 and comprising two spaced blades (FIGURE 2). In the lowered position (selecting position) of the selecting lever 9 as illustrated in unbroken lines in FIGURE 1, the lower edges of the blades of the lever are situated at a short distance from the discs 2 and concentrically with their external circumference, while in the other position of the lever 9 (i.e. the raised position indicated in broken lines) the lever allows the documents to continue in the direction of the track 7 above a fixed body 10 for guiding the documents. When the lever 9 is thus lifited to allow documents to continue to advance along the track, the documents can be taken up and deposited further on by a device similar to that illustrated in FIGURE 1. A number of similar devices may thus be disposed with guiding and selecting levers at intervals along a track at different stacking positions for selecting documents as, for example, in a tabulating machine, a sorting machine or a collating machine.

Bearing against the external circumference of the rings 3, are two rollers 11 carried by an arm 12 arranged to pivot about a pin 13 fast with a part of the fixed structure of the apparatus. An arm 14 fast with the arm 12, is subjected to the action of a spring 15 of which one end is connected to arm 14 and of which the other end is connected to a point 16 of the fixed frame, the spring being so arranged that the rollers 11 are urged against the rings 3.

The arm 4 has at each end (FIGURE 1) a dog or catch 17 which may be formed of the same material as the arm and which is movable in the plane of FIGURE 1. The free end of each dog is resilient and can flex in this plane.

FIGURE 2 and the fragmentary view of FIGURE 4 show that there are disposed on each side of the dog or catch 17, two blades 18 fast with the double arm 4 and extending laterally over the rings 3. The blades 18 are preferably thin and resilient.

Disposed in a recess in the body 10 of the fixed structure, is a control detent 19 intended to stop the arm 4. In FIGURE 3, the said detent is adapted to turn about a transverse pin 20. An extension of the detent 19 is fixed to one end of a spring 21, of which the other end is secured to a fixed point 22. The detent 19 consists, for example, of a steel wire bent into the form of a U, of which the base 23 is situated (FIGURES 1 and 3) against a shoulder 17A on the dog 17. The space between the arms of the detent 19 is greater than the width of the dog 17, so that the latter can freely penetrate into the said space.

Also provided in the recess in the body 10 of the fixed structure, is a bar 24 (FIGURE 3) against which the end of the dog 17 is adapted to bear. Disposed below the discs 2 of the driving device is a plate 25 for the deposition of the documents. The plate 25 is mounted on a movable column 26 which is vertically guided and resiliently urged upwards in known manner. For the sake of simplicity, there is illustrated in FIGURES 1 and 2, a stack of documents 27 deposited on the plate 25, all of which documents are of the same width. The documents are aligned against a fixed stop plate 28 having at its upper end two vertical stop lugs 29 and a pair of intercepting lugs 30 disposed on either side of the driving discs 2.

In another constructional form illustrated in FIGURE 5, a conveying member comprises a detent 19A pivotally mounted on a transverse pin 20A which is fast with an extension 31 of an arm 4. The conveying member of FIGURE 5 is illustrated in the stopped position in which the base 23A of the detent 19A abuts a catch 32 integral with the fixed body 10, while the dog 17 engages in a recess 24A in the fixed body 10.

In a modified constructional form of the guide lever (FIGURES 6 and 7), the lever 9A on the conveying track 7 comprises a resilient blade secured to a fixed part 10A, above which there is situated a control electromagnet 35.

In a constructional form illustrated in FIGURES 8 to 11, the dog 17B of a conveying member is fast (FIGURE 8) with a rocking support 41 adapted to rock about a pin 42 fast with the arm 4. A lug 43, also fast with the support 41, is brought against the arm 4 by a spring 44. The support 41 is also provided with an extension 45 which supports auxiliary friction members consisting of bars 46 extending in front of the rings 3 on the discs 2. In FIGURE 8, the dog 17B is shown in the stationary position in which it is held fast on the one hand by the detent 19 and on the other hand by the bar 24 as in the device illustrated in FIGURE 3.

FIGURES 10 and 11 illustrate a conveying member of the type illustrated in FIGURES 8 and 9, for depositing a document on a stack 27. The device comprises two rollers 47 and 48 adapted to turn about a pin 40 mounted on a support 51 fast with the stop plate 28, which applies the said rollers against the rings 3 on the driving device.

The apparatus described with reference to FIGURES 1 to 4, operates as follows:

Documents S are successively introduced into and advanced along the conveying track 7 (FIGURE 1). The forward edges of the documents follow one another in principle at substantially fixed intervals, although these intervals need not be exactly constant, while the documents themselves may differ considerably in dimensions and in nature, as hereinbefore stated. The driving discs 2 are rotated by the shaft 1 at a constant speed such that the peripheral velocity of the rings 3 is substantially equal to the speed of advance of the documents introduced into the device through the track 7. The external radius of the rings 3 is so chosen that the distance along the circumference of the rings between the front of a conveying member in the stationary position in front of the fixed body 10 and the stop plate 28, is equal to or greater than the greatest interval between the forward edges of two successive documents.

In the position illustrated in FIGURES 1 and 3, the arm 4 is held stationary by virtue of the fact that the end of the dog or catch 17 bears against the bar 24, while the portion 23 of the detent 19 abuts the shoulder 17A of the dog 17, as illustrated in detail in FIGURE 3. Under these conditions, the arm supporting the conveying members can neither be driven under the action of the friction exerted by the shaft 1 and the friction plates 6, nor move in the reverse direction.

When the guide lever 9 is in the selecting position indicated in FIGURES 1 and 3, a document arriving by way of the track 7 passes under the rollers 11, whereafter it is lowered by the lever 9 towards the rings 3 on the driving discs. The document thereafter becomes engaged between the said rings, on the one hand, and the detent 19 and the dog 17 of the conveying device, on the other hand. In engaging below the dog 17, the forward edge of the document lifts the detent 19 and releases the arm 4. The document is driven by the frictional action of the rings 3 on the driving discs and by the action of the rollers 11 pressing the document strongly against said rings and drives the conveying member with the arm 4. The latter is also driven by the friction against the shaft 1 and the friction plates 6. The engaged document also contributes, by friction with the rings on the discs, to the driving of the arm, but the latter, by reason of its inertia, cannot immediately reach the angular velocity of the discs 2 and consequently the forward edge of the document is pushed by the rollers 11 and strongly engaged under the dog 17, as a result of which the friction coupling between the rings 3 and the arm 4 is completed. After the disengagement of the dog 17, the detent 19 continues to press the document against the rings 3 under the action of the spring 21, whereby there is brought about an additional friction and a reduction of the action of centrifugal force, which would tend to move the document away from the driving rings.

The forward end of the document thus reaches the stack on which it is to be deposited. It first reaches the intercepting lugs 30 which are disposed on either side of the driving discs 2, and which retain it, whereby the document is released from the rings 3 and the friction of the document against the rings is cancelled out. At the same time, the end of the dog 17 bears against the stack 27, moves it downwardly, and facilitates the introduction of the forward edge of the document under the intercepting lugs 30 of the stop plate 28.

The document thus deposited therefore remains on the stack 27, while the arm 4 continues to be driven by the aforesaid frictional elements.

In the deposition of a document on the stack, the arm 4 meets some resistance by virtue of the fact that it tends to be retained by the dog 17, of which the end rubs against the stack of documents which have already been deposited. Now, at the time of the deposition of a document, the other end of the arm 4 just reaches the top of the discs 2, and the blades 18, which are fast with the said other end of the arm, are engaged at this instant between the rollers 11 and the rings 3 and are thus strongly driven by the said rings. The arm 4 therefore continues to turn and the dog 17 which is on top slides under the fixed body 10 until the portion 23 of the detent 19 engages the shoulder 17A of the said dog and stops the said arm. Since the dog 17 is resilient, its free end is inwardly flexed by the lower edge of the body 10, the said free end then engaging behind the bar 24 and thus preventing the arm 4 from changing direction as a result of impact at the instant when it is stopped by the detent 19 and from turning in a direction opposite to that of the discs 2. The arm 4 is thus stopped in both directions and cannot be released again until the forward edge of a document is introduced under the detent 19.

The shape, size and positioning of the lugs 30 on the stop plate 28, which lugs are clearly visible in FIGURES 1 and 2, are so chosen that the stack 27 of deposited documents, which stack is resiliently and continuously pressed upwards, can never touch the rings 3, which might damage or mark the documents.

In the modification illustrated in FIGURE 5, the detent 19A of the conveying member illustrated is disposed in scissors form, that is to say, crossed in relation to the dog 17. This arrangement is suitable more especially for dealing with thin documents which would not have sufficient rigidity to push the detent 19 of FIGURE 3 by merely bearing against the rings 3, while in the arrangement of FIGURE 5 the dog 17 and the detent 19a are very close to one another and the forward edge of a document introduced into the apparatus can thus readily lower the detent 19A and disengage it from the catch 32, so that the said detent takes up the position indicated in broken lines in FIGURE 5 and is maintained therein by the document bearing against the dog 17. After the deposition of a document on the stack, the detent 19A is returned by the spring 21A into a position limited by an abutment 33.

The guiding and selecting lever 9A illustrated in FIGURE 6 is controlled by the electromagnet 35 mounted on the fixed body of the machine. When the electromagnet 35 is not energised, the right-hand end of the lever rests in the fixed part 34 of the conveying track 7. The documents S1 arriving from the right then pass on to the upper face of the blade constituting the said lever and under the electromagnet 35, so that the documents continue to move above the fixed portion 10A, while when the electromagnet 35 is energised it lifts the blade 9A in such manner that a document arriving from the right passes under the blade and is thus guided by the lower face of portion 10A and follows the driving discs 2 disposed below the latter, and is deposited by the conveying member in the manner described with reference to the preceding figures.

An auxiliary guide device 36 (FIGURE 6) is provided for satisfactorily guiding the documents below the blade 9A or the electromagnet, even if the forward edge of the documents should be slightly curved or raised. In this way, the documents are prevented from abutting the electromagnet or the guide lever and are always well directed.

The arrangement hereinbefore described with reference to FIGURES 1–4 are particularly adapted to deal with documents having sufficient rigidity, but for dealing with documents having low rigidity, or with documents which are fragile or creased, it is advantageous for these documents to be deposited on the stack without having to be subjected to forces which might damage them. It will be seen from the constructional example of a conveying member as illustrated in FIGURE 5 for dealing with documents of low rigidity, that the friction exerted by such documents on the rings 3 is particularly low. It will also be observed that in the apparatus illustrated in FIGURE 1, the pressure exerted by the dog 17 on the stack of documents 27 at the time when a document is to be deposited on the stack, tends to flex the dog in such a manner as more strongly to clamp against the rings 3 the document to be deposited on the stack and this might damage the document. This disadvantage may be overcome by employing the apparatus illustrated in FIGURES 8 to 11, the operation of which is as follows: In FIGURE 9, a document S2 is advanced along the rings 3 and lifts the detent 19 in order to disengage it from the dog 17B. At the same time, the document S2 lifts the dog and brings the members 46 into contact with the rings 3. The dog 17B receives a thrust from the document S2 which is driven by the rings and acts as a lever arm on the friction members 46, forces them into the rings 3 and thus contributes to the driving of the conveying member as far as the stack of documents 27.

On arriving at the stack of documents (FIGURES 10 and 11), the friction members 46 become engaged (FIGURE 10) between the rollers 47, 48 and the rings 3 and are forced deeply into the said rings by the said rollers, whereby the rocking of the support 41 about the pin 42 is accentuated, the dog 17B is lowered and bears firmly against the stack 27, and the document S2 is released and deposited without excessive force on to the stack. It will be obvious that under these conditions the driving of the conveying member at the instant when a document is deposited on the stack, is effected by the friction members 46 engaged between the rollers 47 and 48 and the rings 3. In this embodiment, the blades 18 which at the same time pass under the rollers 11 are not required. In another constructional form, the rollers 47 and 48 of FIGURES 10 and 11 may be replaced by fixed plates 50, which are represented by dashdotted lines in FIGURE 10. These plates are fast with the fixed plate 28 and are preferably disposed in the plane of the rings 3 or in proximity thereto in order to urge the bars 46 against the said rings.

It will be noted that the above-described apparatus may with advantage be employed in combination with the arrangement of the dog or detent 19A illustrated in FIGURE 5. This combination, which can readily be effected by a person skilled in the art, is particularly adapted for the treatment of documents of low rigidity or even slightly damaged documents.

It will be obvious that the examples hereinbefore described to illustrate a number of applications of the invention, are in no way limitative and that any modifications, omissions, substitutions or adaptations may be made in the described apparatus in accordance with the circumstances and applications without departing from the spirit of the invention.

I claim:

1. In apparatus for conveying and stacking flexible sheets, the combination of means including a track for separately advancing sheets to a selecting point; means at said selecting point for selecting sheets to be conveyed and stacked; a continuously rotatable driving device disposed adjacent said selecting point for receiving selected sheets and comprising two discs each provided on its periphery with a friction ring engageable with selected sheets; two conveying and guiding members fast with one another and mounted for movement in proximity to said friction rings; means for frictionally transmitting drive from said driving device to said conveying and guiding members in order to guide, convey and deposit selected sheets onto a stack; locking means for holding one of said conveying members stationary in a position to receive the forward edge of a selected sheet fed to said one of said conveying members by said friction rings, said locking means including means responsive to feeding of the sheet to said one of said conveying members for releasing said locking means to enable said driving means to drive said conveying members frictionally; and means cooperable with said one of said conveying members for releasing said sheet therefrom to deposit the released sheet on the stack substantially simultaneously with the movement of the other of said conveying members to said selecting point with attendant locking of said other of said conveying members by said locking means.

2. Apparatus according to claim 1 in which said means responsive to feeding of the selected sheet to said one of said conveying members for releasing said locking means comprises a detent engageable by the forward edge of said sheet, said apparatus comprising rollers adjacent said selecting point urged toward said friction rings, whereby the sheet will be gripped between said rollers and said friction rings and the forward edge of said sheet will be moved forceably against said detent to operate the latter and release said locking means.

3. Apparatus according to claim 1 in which said means responsive to feeding of the selected sheet to said one of said conveying members comprises a pin on said member, a support rockably mounted on said pin, and a dog fast with said support; said apparatus further comprising auxiliary friction members on said conveying and guiding members extending adjacent said friction rings and so disposed that the advancing of the selected document by a conveying and guiding member brings said auxiliary friction members into contact with said friction rings to thereby additionally frictionally couple said conveying and guiding members to said driving device.

4. Apparatus according to claim 3 in which said auxiliary friction members are carried by said rockably mounted support; said apparatus further comprising rollers positioned to have rolling engagement with said friction rings in proximity to but beyond the position for deposition of sheets on the stack, said auxiliary friction members being engageable between said friction rings and said rollers when the associated conveying member presents a document to the stack, whereby urging of said auxiliary friction members against said rings by said rollers will rock said support and said dog to press said dog against the stack and also release the sheet carried by said conveying member while the latter is further driven by the action of said rings on said auxiliary friction members then engaged between said rings and said rollers.

References Cited in the file of this patent
UNITED STATES PATENTS

| | | |
|---|---|---|
| 912,764 | Wintgens | Feb. 16, 1909 |
| 2,794,637 | Rugg | June 4, 1957 |
| 2,960,027 | Pantze | Nov. 15, 1960 |